Figure 1:
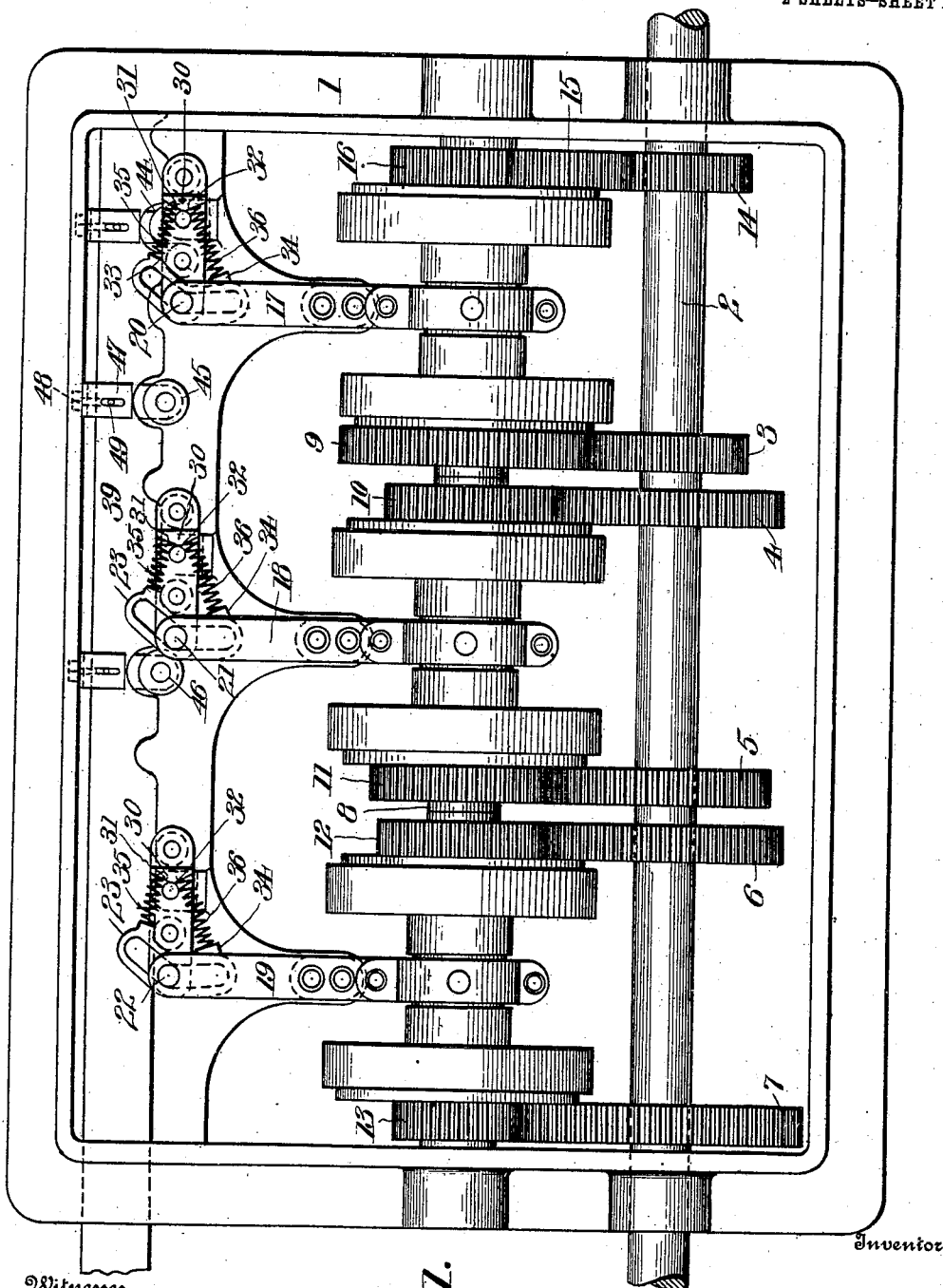

F. B. ALLEN.
CLUTCH SHIFTING MECHANISM.
APPLICATION FILED AUG. 31, 1909.

980,897.

Patented Jan. 10, 1911.

2 SHEETS—SHEET 1.

Witnesses

Inventor
Frank B. Allen
By Sturtevant & Mason
Attorneys

F. B. ALLEN.
CLUTCH SHIFTING MECHANISM.
APPLICATION FILED AUG. 31, 1909.
980,897.
Patented Jan. 10, 1911.
2 SHEETS—SHEET 2.
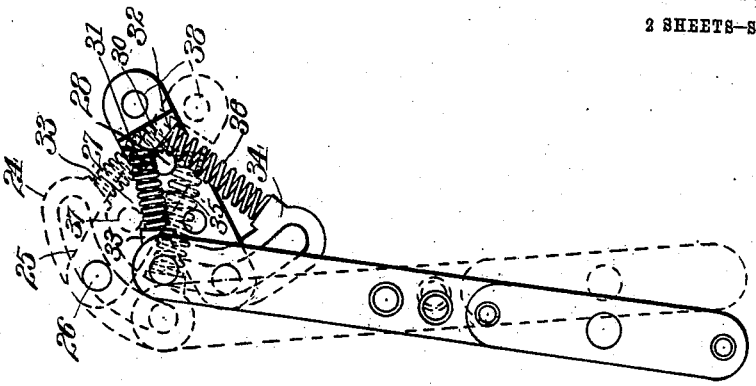
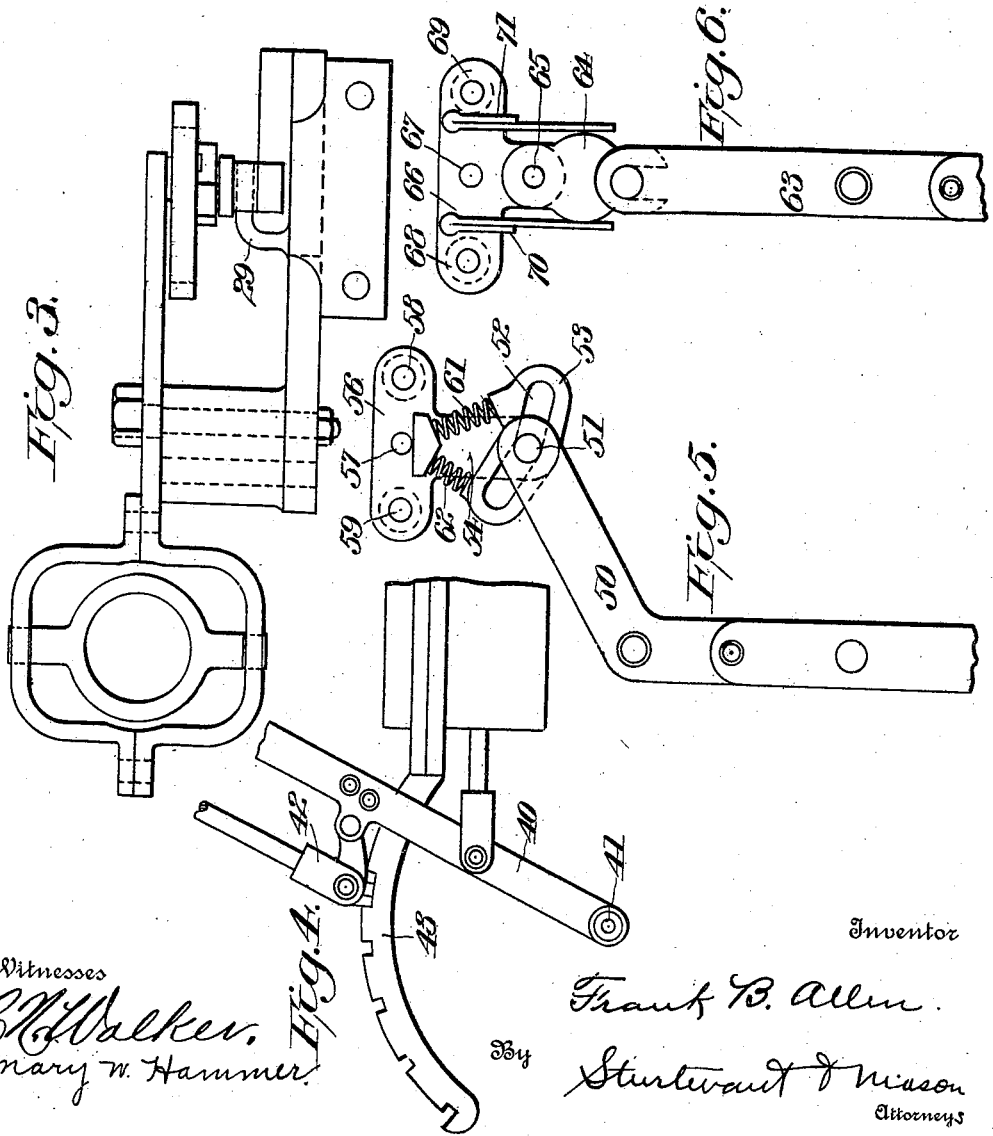
Witnesses
C. N. Walker.
Mary W. Hammer.
Inventor
Frank B. Allen.
By Sturtevant & Mason
Attorneys

UNITED STATES PATENT OFFICE.

FRANK B. ALLEN, OF SALT LAKE CITY, UTAH.

CLUTCH-SHIFTING MECHANISM.

980,897. Specification of Letters Patent. Patented Jan. 10, 1911.

Application filed August 31, 1909. Serial No. 515,528.

*To all whom it may concern:*

Be it known that I, FRANK B. ALLEN, a citizen of the United States, residing at Salt Lake City, in the county of Salt Lake, State of Utah, have invented certain new and useful Improvements in Clutch-Shifting Mechanism, of which the following is a description, reference being had to the accompanying drawing and to the letters and figures of reference marked thereon.

The invention relates to new and useful improvements in clutch shifting mechanism and more especially to a clutch shifting mechanism for a plurality of transmission gears.

An object of the invention is to provide a clutch shifting mechanism wherein a plurality of clutches may be shifted one after another in succession, and wherein the mechanism for shifting the clutches is positive in its action and simple in construction so that the same is not liable to get out of order.

The invention consists in the parts, arrangements, and improvements hereinafter described and set forth in the appended claims.

In the drawings which show by way of illustration one embodiment of the invention:—Figure 1 is a plan view of a transmission gear showing my clutch shifting mechanism. Fig. 2 is an enlarged detail showing the clutch shifting cam in two positions. Fig. 3 is a detail showing the clutch shifting lever and the clutch shifting mechanism in end view. Fig. 4 is a detail showing the operating lever. Fig. 5 is a detail showing a modified form of operating cam. Fig. 6 is a detail showing a still different modified form of operating member.

In the drawings, I have shown a casing 1, in which is mounted a shaft 2 carrying a plurality of gears 3, 4, 5, 6, and 7. These gears increase in diameter in the order of 3, 5, 4, 6 and 7. A shaft 8 is located parallel with the shaft 2 and carries a plurality of gears 9, 10, 11, 12 and 13, which mesh with the corresponding gears on the shaft 2. The gears 9, 11, 10, 12 and 13 decrease in diameter in the order stated. The gears 9 to 13 inclusive are loosely mounted on the shaft 8 and when clutched to the shaft will cause different speeds to be transmitted from the shaft 2 to the shaft 8 or from the shaft 8 to the shaft 2 depending upon which of these shafts is the driving member and which is the driven member.

A gear 14 meshes with a gear 15 carried by a bearing stud mounted in the casing 1. The gear 15 meshes with a gear 16, and when the gear 16 is locked to the shaft 8, a reverse transmission occurs.

As a means for clutching the gears to the shaft 8, I have provided levers 17, 18 and 19. These levers are so located as to coöperate each with a pair of clutches on the shaft 8. If the lever 17 is swung in one direction, the gear 16 will be locked to the shaft 8. If it is swung in the opposite direction, then the gear 9 will be locked to the shaft 8. By swinging the levers 18 and 19 first in one direction and then another, the correspondingly controlled clutches will be brought into operative engagement with their coöperative gear.

The lever 17 carries at its upper end a roller 20. Similar rollers 21 and 22 are carried respectively by the levers 18 and 19. As a means for shifting the levers 17, 18 and 19, I have provided a plurality of swinging members 23, 23, 23. The swinging members 23 are precisely the same in construction and it will be necessary therefore, to only describe one of these members. Said member 23 as more clearly shown in Fig. 2, consists of a plate 24 having a slot 25, which engages the corresponding roller on the lever with which it coöperates. Said plate 24 is pivoted at 26 to an arm 27 which in turn is pivoted at 28 to a bracket arm 29 carried by the casing for the transmission gear. Said arm 27 is provided with an offset member 30 having inclined faces 31, 32. The plate 24 is provided with projecting lugs 33, 34. A spring 35 is interposed between the lug 33 and the inclined face 31. A spring 36 is interposed between the lug 34 and the inclined face 32. These springs operating against the plate 24 on the opposite sides of its pivot will neutralize each other and hold the plate 24 substantially in rigid position on the arm 27. The arm 27 is provided with two rollers 37 and 38 which are located on opposite sides of the pivotal support 28.

It will readily be seen that if the arm 27 is swung to the lower position shown in Fig. 2, that the roller 20 running in the slot in the plate 24, will be carried to the right and the clutch controlled by the lever 17, shifted to the left and the gear 9 locked to the shaft 8. If the swinging arm 27 be moved upward to the position shown in dotted lines in Fig. 2, then the roller 20 running in the curved slot will be moved to the left and the clutch operated by the lever 17 be moved to the right, thus locking the gear 16 to the shaft 8. A similar movement of the swinging members controlling the levers 18 and 19 will cause first one and then the other of the clutches to be locked to the shaft 8. As a means for swinging the members 23, I have provided a sliding bar 39, which slides in ways formed in the casing and is controlled by a lever 40 pivoted at 41 and locked in adjusted positions by means of a pawl 42 coöperating with a notched segment 43.

These parts are of the usual construction and will not need further description.

A sliding bar 39 is provided with three spaced rollers 44, 45, and 46. Each of these rollers is carried by a bracket 47 which may be adjusted by a nut 48 and held in adjusted position by a set screw 49. These rollers are so disposed on the sliding bar 39, that as it is reciprocated through the hand lever 40, the roller 44 will be brought into coöperative action with the swinging plate controlling the lever 17, then the roller 45 will be brought into coöperative action with the swinging member controlling the member 18 and finally the roller 46 will be brought into coöperative action with the swinging member 23, controlling the lever 19.

As above noted, the swinging arms 27 are provided with two rollers. These rollers are located in the path of the rollers carried by the sliding bar 39. If the sliding bar is moved to the right as viewed in Fig. 1, the roller 44 will engage the roller 38 on the arm 27, throwing the slotted member 24 upward, which will shift the clutch to cause a reverse drive.

If the sliding bar is moved to the left as viewed in Fig. 1, the roller 44 will engage the roller 37 and swing the slotted plate 24 downward, thus locking the clutch 9 to the shaft 8. A further movement of the sliding bar 39 to the left will bring the roller 45 into engagement first with the roller 38 on the arm 27 carrying the slotted plate 24, coöperating with the roller 21, and thence into contact with the roller 37 on said arm. This will first lock the clutch gear 10 to the shaft and then the clutch to the gear 11. A still further movement to the left will cause the roller 46 to operate the swinging arm 27 carrying the slotted plate engaging the roller 22.

In Fig. 5, I have shown the clutch shifting lever 50 as slightly bent at its upper end and carrying a roller 51 running in a slot 52 in a plate 53 pivoted to an arm 54 formed rigidly with a swinging member 56, pivoted at 57 to the casing. Said swinging member 56 carries two rollers 58 and 59 which are operated upon by the rollers carried by the sliding bar. Springs 61 and 62 operate to hold the plate 53 from oscillation about its pivot in precisely the same manner as described in connection with the springs 35 and 36. The swinging of the plate 53 in one direction will shift the lever 50 to the right and the swinging of the plate in the opposite direction will shift the lever 50 to the left.

In Fig. 6 I have shown the clutch shifting lever 63 as carrying a roller which is engaged by the forked end of an arm 64 pivoted at 65 to a swinging plate 66 which in turn is pivoted at 67 to the casing. Said plate 66 carries two rollers 68 and 69. Springs 70 and 71 engage the sides of the arm 64 and normally hold the same from swinging on its pivot. When the swinging plate 66 is swung in one direction by means of the sliding bar 36, the clutch shifting lever 63 will be swung in the other direction, that is, to the left.

The object of the springs 35 and 39 is to allow the clutches to be forced into contact with its coöperating part in a yielding manner. After the clutch is set tight the plate 24 will oscillate about its pivot compressing either the spring 35 or the spring 36, allowing the arm 27 to swing sufficiently on its pivot to allow the rollers on the sliding bar and the arm 27 to pass.

The object of the springs 61 and 62, and also 70 and 71 is precisely the same. It will be seen therefore, that I have provided a clutch shifting mechanism which is controlled by a swinging lever and by swinging the lever back and forth first one clutch and then another is operated, and it will be impossible to operate the high speed clutch after having operated the slow speed clutch, without operating the intermediate clutches.

Having thus particularly described my invention, what I claim as new and desire to secure by Letters Patent, is:—

1. A clutch shifting mechanism including in combination, a plurality of clutches, a plurality of independently movable members, yielding means carried by said movable members, clutch shifting mechanisms operatively connected to said yielding means, and means for operating said movable members, whereby first one clutch and then another is shifted.

2. A clutch shifting mechanism including in combination, a plurality of clutches, a pivoted member, yielding means carried by said pivoted member, clutch shifting mechanisms operatively connected to said yielding means, and means for operating said pivoted member, whereby first one clutch and then another is shifted.

3. A clutch shifting mechanism including in combination, a plurality of movable members, yielding means carried by said members, clutch shifting mechanisms connected to said yielding means, and a sliding bar having devices for operating said movable members successively.

4. A clutch shifting mechanism, including in combination, a plurality of pivoted members, pivoted cams carried by said pivoted members, clutch shifting mechanisms operatively connected to said cams, and means for operating said pivoted members in succession.

5. A clutch shifting mechanism including in combination a plurality of pivoted members, cams pivotally carried by said members, means for yieldingly holding said cams from turning on their pivots, clutch shifting mechanisms operatively connected to said cams, and means for operating said pivoted members in succession.

6. A clutch shifting mechanism including in combination, a plurality of pivoted members, cams pivotally carried by said members, means for yieldingly holding said cams from turning on their pivots, clutch shifting mechanisms operatively connected to said cams, and a sliding bar having a device for operating said pivoted members in succession.

7. A clutch shifting mechanism including in combination, a plurality of pivoted members, cams pivotally carried by said members, means for yieldingly holding said cams from turning on their pivots, clutch shifting mechanisms operatively connected to said cams, a sliding bar, and rollers adjustably carried by said sliding bar and disposed so as to operate said pivoted members in succession.

8. A clutch shifting mechanism including in combination, a plurality of clutches, a plurality of movable members, cams yieldingly carried by said movable members, clutch shifting mechanisms operatively connected to said cams, a sliding bar, and adjustable rollers carried by said bar, and disposed so as to engage first one and then the other of said movable members.

9. A clutch shifting mechanism including in combination, a plurality of clutches, a plurality of pivoted members, rollers carried by said pivoted members and located upon opposite sides of the pivot thereof, a cam yieldingly mounted upon each of said pivoted members, a clutch shifting mechanism controlled by each of said cams, and devices for engaging first one roller and then the other of said pivoted members in succession, whereby first one clutch and then another is shifted.

10. A clutch shifting mechanism including in combination, a plurality of clutches, a plurality of pivoted members, rollers carried by said pivoted members and located upon opposite sides of the pivot thereof, a cam yieldingly mounted upon each of said pivoted member, a clutch shifting mechanism controlled by each of said cams, a sliding bar, adjustable members carried by said sliding bar and disposed so as to engage first one roller and then the other, carried by said pivoted members, whereby first one clutch and then another is shifted.

11. A clutch-shifting mechanism including in combination, a plurality of clutches, a plurality of pivoted members, rollers carried by said pivoted members and located on the opposite sides of the pivots thereof, a slotted member pivoted intermediate its ends to each of said first named pivoted members, springs for engaging each of said slotted members and yieldingly holding the same from turning on its pivot, clutch-shifting levers arranged so that each has operative connection with one of said slotted members, and means for engaging first one roller and then another of each of said pivoted members, whereby the clutches are shifted one after the other.

12. A clutch-shifting mechanism including in combination, a plurality of clutches, a plurality of pivoted members, rollers carried by said pivoted members and located on the opposite sides of the pivots thereof, a slotted member pivoted intermediate its ends to each of said first named pivoted members, springs for engaging each of said slotted members and yieldingly holding the same from turning on its pivot, clutch-shifting levers arranged so that each has operative connection with one of said slotted members, and means for engaging first one roller and then another of each of said pivoted members, whereby the clutches are shifted one after the other, said means including a sliding bar and adjustable rollers carried thereby.

13. A clutch shifting mechanism including in combination, a movable member, a slotted member pivoted thereto, springs for yieldingly holding said slotted member from turning on its pivot and a clutch shifting lever operatively connected with said slotted member.

14. A clutch shifting mechanism including in combination, a pair of clutches, a lever for operating first one clutch and then the other, a pivoted member, a slotted member carried by said pivoted member and operatively connected with said lever, means for swinging said pivoted member first in one direction and then the other for operating said clutches in succession.

15. A clutch shifting mechanism including in combination, a plurality of clutches, a shifting lever common to said clutches, a pivoted member, rollers carried by said pivoted member, and located on the opposite sides of the pivot thereof, a slotted member pivoted to said pivoted member, and operatively connected with said lever, springs for engaging said slotted member on opposite sides of its pivot, for yieldingly holding the same from turning on its pivot, a sliding member, an adjustable roller carried by said sliding member, and adapted to engage first one roller and then the other on said pivoted member, for shifting the lever first in one direction and then the other, to operate said clutches.

In testimony whereof I affix my signature, in presence of two witnesses.

FRANK B. ALLEN.

Witnesses:
FRANK E. VICKERY,
CAMILLE HANSON.